United States Patent
Berg et al.

(10) Patent No.: US 7,051,641 B2
(45) Date of Patent: May 30, 2006

(54) ADJUSTMENT FOR STEERING LEVERS FOR HYDROSTATIC DRIVE

(75) Inventors: Gerald M. Berg, Lisbon, ND (US); Lance S. Tuhy, Fargo, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 14 days.

(21) Appl. No.: 10/896,802

(22) Filed: Jul. 22, 2004

(65) Prior Publication Data

US 2006/0016185 A1    Jan. 26, 2006

(51) Int. Cl.
  *F01B 3/00* (2006.01)
(52) U.S. Cl. .......................................... 92/12.2; 91/505
(58) Field of Classification Search ................. 60/487; 74/839; 91/505; 92/12.2
  See application file for complete search history.

(56) References Cited

U.S. PATENT DOCUMENTS

| | | | | |
|---|---|---|---|---|
| 2,001,239 A | 5/1935 | Buckendale | ................ | 188/196 |
| 2,015,881 A | 10/1935 | Alden et al. | ................ | 188/196 |
| 2,922,317 A | 1/1960 | House | ......................... | 74/522 |
| 3,605,519 A | 9/1971 | Heggen | ..................... | 74/480 R |
| 3,772,964 A | 11/1973 | Erickson et al. | ............ | 91/411 |
| 3,897,840 A | 8/1975 | Molzahn et al. | ........... | 180/6.48 |
| 3,938,401 A | 2/1976 | Bauer | ........................ | 74/471 R |
| 3,968,706 A | 7/1976 | Bauer | ........................ | 74/471 R |
| 3,990,320 A | 11/1976 | Habiger | ..................... | 74/473 R |
| 3,995,426 A | 12/1976 | Habiger | ........................ | 60/486 |
| 4,043,416 A | 8/1977 | Albright et al. | ........... | 180/6.48 |
| 4,064,766 A | 12/1977 | Rinaldo | ..................... | 74/473 R |
| 4,495,770 A | 1/1985 | Sagaser et al. | ................ | 60/486 |
| 4,928,647 A | 5/1990 | Villanyi et al. | .............. | 123/400 |
| 5,020,643 A | 6/1991 | Redenbarger | .......... | 188/196 M |
| 5,378,127 A | 1/1995 | Welscher | ..................... | 417/506 |
| 6,487,857 B1 * | 12/2002 | Poplawski et al. | ........... | 92/12.2 |
| 6,539,713 B1 * | 4/2003 | Johnson et al. | .............. | 92/12.2 |
| 6,725,954 B1 | 4/2004 | Keane et al. | | |

FOREIGN PATENT DOCUMENTS

EP    1 270 373    1/2003

OTHER PUBLICATIONS

Service Manual for Model No. 773 Bobcat Loader, pp. 50-110-5 and 50-110-6, published at least as early as Jan. 1996.
Copy of International Search Report.
Copy of Written Opinion.

* cited by examiner

*Primary Examiner*—Edward K. Look
*Assistant Examiner*—Michael Leslie
(74) *Attorney, Agent, or Firm*—Nickolas E. Westman; Westman, Champlin & Kelly, P.A.

(57) ABSTRACT

An adjustable arm assembly is drivably coupled to a control shaft and is moved by a link that has a centered position. The arm has two portions that are releasably clamped together. A first arm portion is connected to drive the control shaft. A second arm portion is connected to the link. The adjustment includes a clamp that will releasably clamp the two arm portions together in a fixed position, and an adjustment screw is used to adjust the relative rotational position of the first and second arm portions to move the first arm portion to position the control shaft in a centered position relative to second arm portion, when the second arm portion is in a spring return position. The arm portions are then clamped together.

8 Claims, 4 Drawing Sheets

ADJUSTMENT FOR STEERING LEVERS FOR HYDROSTATIC DRIVE

BACKGROUND OF THE INVENTION

The present invention relates to a hydrostatic transmission having right and left controllable drive pumps for driving wheels or tracks and for steering a skid steer vehicle. The drive pumps of the hydrostatic transmission each have a control lever for controlling the right and left output shafts for drives on opposite sides of the vehicle. The control levers are spring centered to a neutral position under the force of a single spring. Easily accessible and accurate adjustment devices are provided on the hydrostatic transmission controls for insuring that both the right and left hand drives do not creep when the steering levers are in the neutral position.

The use of hydrostatic transmissions on skid steer vehicles, in particular, skid steer loaders, is well known. Examples of construction include the disclosures in U.S. Pat. Nos. 3,605,519 and 4,043,416.

Obtaining an accurate adjustment for the neutral or non-driving positions of the levers relative to the neutral positions of the transmission drive pumps is needed, or the vehicle will "creep" when the levers are in a neutral position. Before the present invention, the adjustment devices have generally required substantial skill and were not easily accessed. The present invention comprises structure that permits simple and accurate adjustments.

SUMMARY OF THE INVENTION

The present invention relates to a hydrostatic transmission drive system for adjusting the position of the transmission controls relative to the position of a control link which is in a neutral or spring return position. The hydrostatic transmission has separate pump controls to control outputs that couple to right and left hand side drives, respectively. Each pump control comprises a control shaft that is moved by a separate steering lever and steering link. The control shaft for the respective pump has an arm assembly connected thereto so that movement of an outer end of the arm assembly rotates the shaft. The respective arm assemblies in turn are connected to and moved by the steering links and levers.

Each control arm assembly includes two sections that are releasably clamped together. One arm section is connected to the control shaft and the other arm section is connected to the steering link. The arm sections are precisely adjustable relative to each other and will permit centering the control shaft of the hydrostatic pump or transmission to its neutral position by adjusting the position of the one arm section when the steering link and lever connected to other arm sections have returned to the spring loaded centered position, and while holding the other arm section from moving. The draft or creep of the vehicle can then be eliminated.

DETAILED DESCRIPTION OF THE PREFERRED EMBODIMENTS

Figure 1:
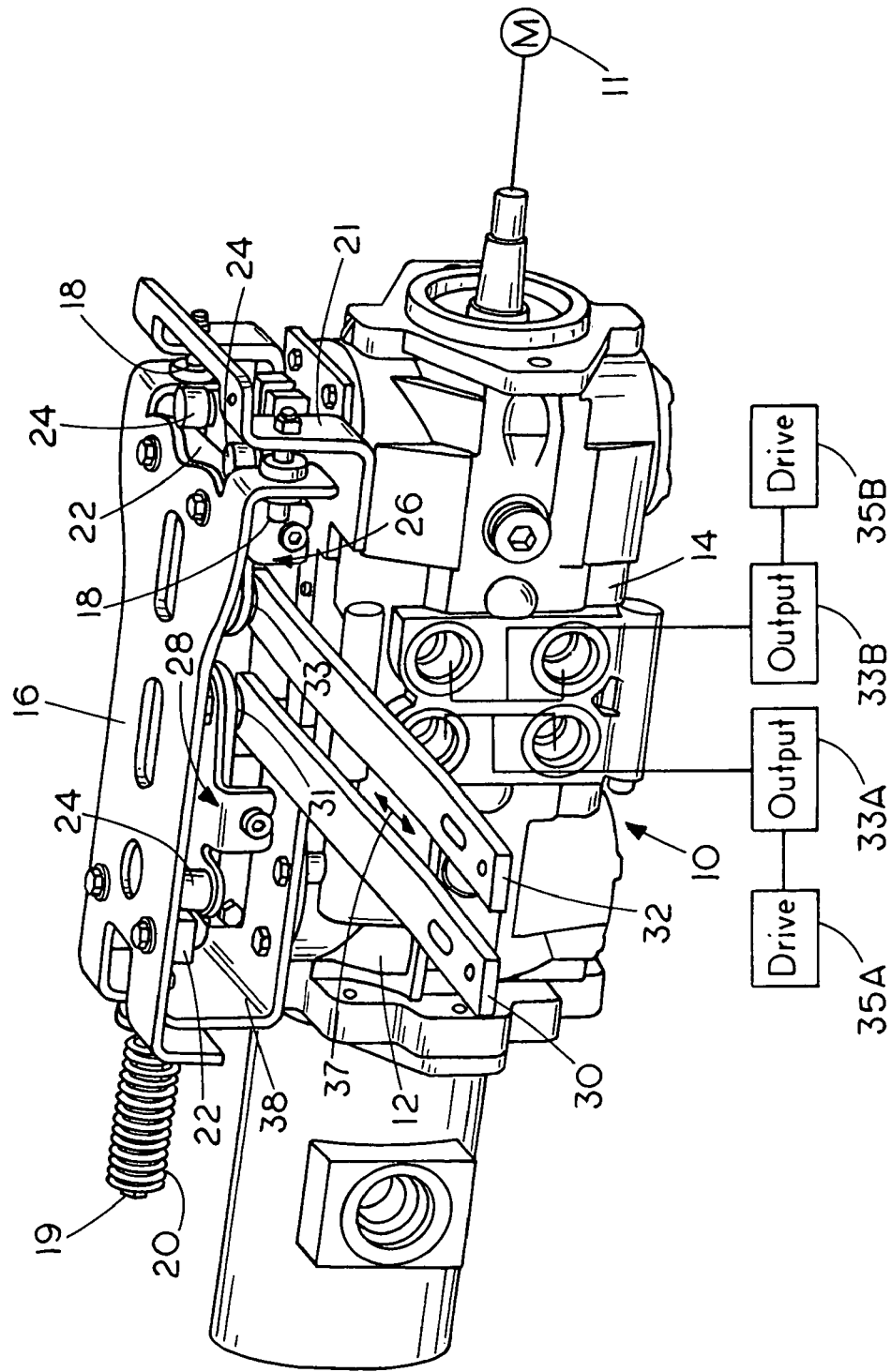
FIG. 1 is a perspective view of a hydrostatic transmission drive assembly showing two hydrostatic pumps with control links from speed control and steering levers illustrated.

FIG. 1 illustrates a hydrostatic transmission and steering assembly 10 used with skid steer vehicles, in particular, with separate variable speed, reversible hydrostatic pumps 12 and 14 that are joined together with a central block, and are powered from suitable power sources such as internal combustion engine, as is well known. The hydrostatic transmission assembly 10 has a top spring centering plate 16 that has one end slidably mounted on support studs 18 on one side of the hydrostatic transmission assembly 10, and the other end of plate 16 is supported for sliding on a spring bolt 19 on the other side of the transmission. The studs 18 and spring bolt 19 are mounted on a support brackets 38 and 21 that is fixed to the transmission. A spring 20 is positioned on bolt 19 and urges the centering plate 16 to the right in FIG. 1. This force urges centering bars 22 that are carried on the centering plate 16 to bear against laterally spaced apart trunions 24 that are mounted onto the respective control arm assemblies 26 and 28. The top centering plate 16 is a centering mechanism for the control arm assemblies 26 and 28. The spring force on the centering plate 16 causes the control arm assemblies 26 and 28 and the hydrostatic pump control shafts to be spring loaded to a central or neutral position.

Each of the control arm assemblies 26 and 28 has a separate steering link 30 and 32, respectively, connected thereto with pivot bolts 31 and 33. As will be explained, the pivot bolts are attached to the ends of top plates of the arm assemblies. The speed control and steering links in turn are connected to speed control and steering levers (not shown) that are operated by an operator of the vehicle and which will cause the links 30 and 32 to move back and forth under operator control as indicated by a double arrow 37. The links and levers will be called steering links and steering levers for convenience.

The hydrostatic pumps have trunion or control shafts 36 that extend up through the bracket plate 38 that supports the centering plate 16. The rotation of the trunion or control shafts 36 about an upright axis causes the hydrostatic pumps to provide their outputs 33A and 33B as a function of the control shaft position. The rotation of the trunion control shaft in opposite directions from a central position causes the hydrostatic pump outputs to reverse, and the output flow and thus the speed of connected drive motors or drives 35A and 35B is proportioned to the displacement of the trunion shafts from center.

The respective control arm assemblies 26 and 28 are adjustable, so that in the spring loaded centered position of the control centering plate and arm assemblies, determined by spring 20, and by the centering trunions 24 engaged by the centering bars 22, the trunion shafts 37 will be in neutral. The control arm assemblies 26 and 28 are each formed as two arm sections that are adjustable relative to each other. One control arm assembly will be shown in detail, and the other control arm assembly is a mirror image of the one shown.

Figure 2:
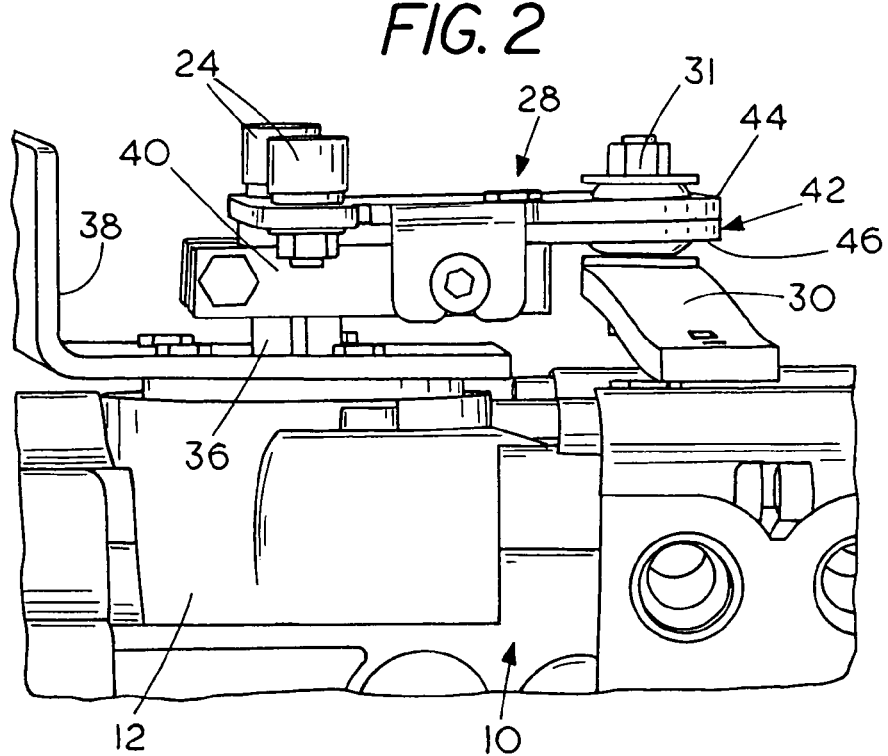
FIG. 2 is a front elevational view of the control shaft portion of one of the hydrostatic pumps of the hydrostatic transmission.

As illustrated in FIG. 2, arm assembly 28 includes a bottom pintel arm 40 that receives and mounts onto the trunion shaft 36 for the hydrostatic pump 12. The bottom pintel arm 40 has a split hub end that is clamped onto the trunion shaft 36 with a bolt, as can be seen in FIGS. 2 and 4. The top pintel arm 42 is made to overlie and is adjustably secured (or releasably clampable) to the bottom pintel arm 40. The top pintle arm 42 is an assembly of two plates held together, including an upper arm plate 44 and a lower arm plate 46. At the outer end of the top pintel arm 42, the respective steering link, namely link 30 as shown in FIG. 4, is mounted with the pivot bolt 31 to the top pintel arm, so that when the steering link 30 is moved in a longitudinal direction as indicated by the double arrow 37 (FIG. 3), the steering arm assembly 26 or 28 will be pivoted (the top and bottom pintle arms are clamped together in use), and the trunion shaft 36 for the respective pump will be pivoted about an upright axis to change the pump output.

Figure 3:
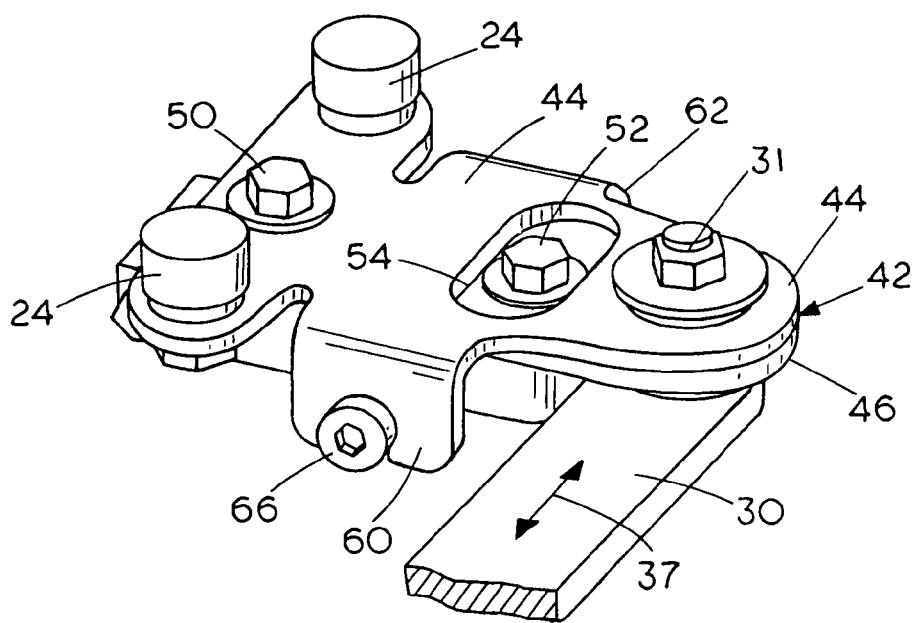
FIG. 3 is a perspective view of the control shaft and control arm assembly of FIG. 2.
Figure 4:
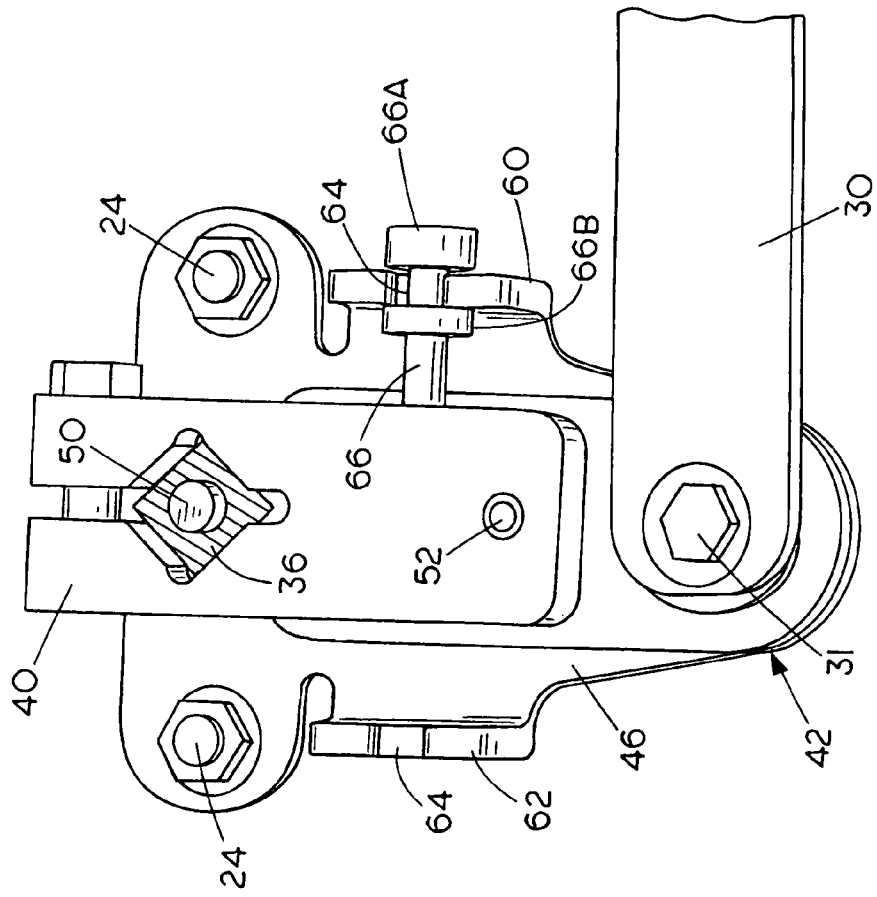
FIG. 4 is an exploded view of the control arm assembly shown in FIG. 3.
Figure 5:
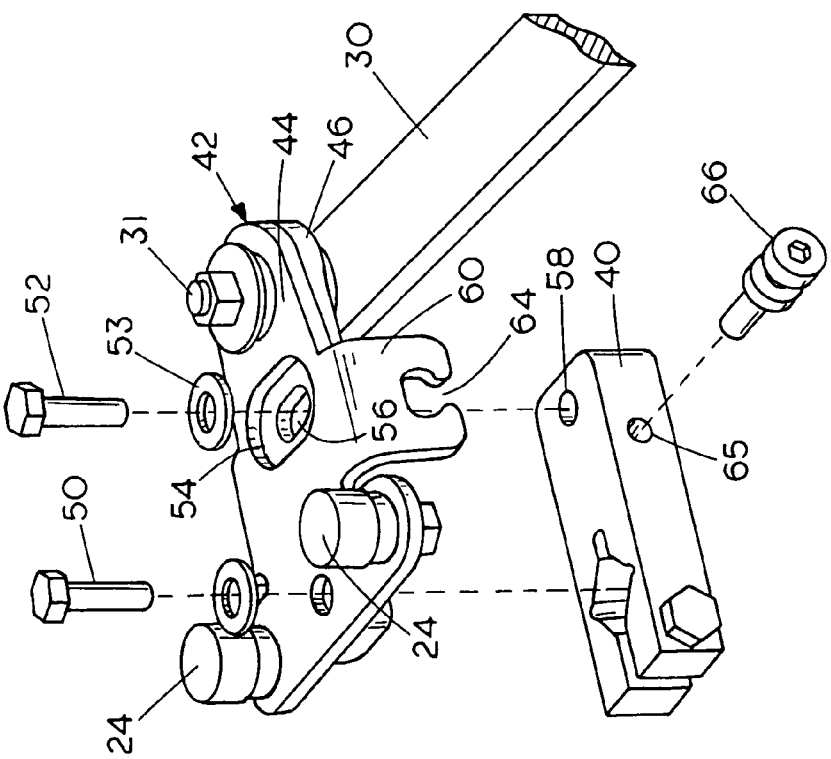
FIG. 5 is a first bottom plan view of the control arm of FIG. 3, to illustrate an adjustment screw utilized for adjusting two sections of the control arm assembly.

The centering trunions 24 that are engaged by the bars 22 on the spring loaded centering plate 16 for centering the trunion shaft 36 are laterally spaced as shown in FIGS. 3 and 4, for example. The bar 22 on the respective end of the spring loaded centering plate 16 bears against both of the trunions 24 for each control arm assembly when the arm assembly is centered. When the arm assemblies are not centered, one trunion 24 will be engaged before the other and the force will create a moment about the axis of the trunion shaft 36 to center the control arm assembly and rotate the trunion shaft 36 under the spring load.

The top pintel arm 42 is mounted to overlie the bottom pintel arm 40, and is held on the end of the trunion shaft with a first clamp screw or bolt 50 that threads into a threaded axial bore in the trunion shaft 36. The screw 50 will clamp the top pintel arm 42 down onto the top of the trunion shaft 36. The top pintel arm can pivot about the bolt 50 and thus the axis of the trunion shaft (when the bolt is loosened) relative to the trunion shaft 36 and the bottom pintel arm 40. The bottom pintel arm 40 is fixed on the trunion shaft 36 because of the square shape of the shaft and the bore on the bottom pintel arm 40 that receives the trunion shaft.

A second clamp screw or bolt 52 is positioned so that it will pass through a large slot 54 in the upper arm plate 44 of the top pintel arm 42, and extends through a slot 56 (FIG. 4) in the lower arm plate 46 of the top pintel arm 42.

The clamp bolt 52 is aligned with a threaded bore 58 near the outer end of bottom pintel arm 40. Clamp bolt 52 has a washer 53 under its head. The washer fits into the slot 54, but will clamp against the sides of the slots 56 in the lower arm plate 46, so the bolt 52 will clamp the top arm 42 and lower arm 40 together, when it is threaded into this bore. The top pintel arm 42 can thus be clamped tightly against the bottom pintel arm 40 by use of the clamp bolts 50 and 52, so the pintel arms move as a unit.

The upper plate 44 of the top pintel arm has a pair of downwardly depending flanges 60 and 62, along the sides that overlie and are spaced from the sides of the lower pintel arm 40. The flanges have open bottom slots 64 at their lower edges. The slots 64 align with threaded bores 65 in the sides of the bottom pintel arm 40. The slots have a wider upper portion (FIG. 4) to permit the angular adjustment of the pintel arms that will be explained. An adjustment screw 66, which has a head 66A and a flange 66B spaced from the head can be threaded into a side bore 65. The upper plate flange 60 is positioned in the slot 66C formed by the head 66A and the flange 66B on the adjustment screw 66 as the screw is threaded into the bore.

It can be seen that the open ended slot 64 forms a type of a saddle. The slot 64 in the flange 60 is slipped over the screw between the head 66A and the flange 66B. Then, depending on the direction of threading of the adjustment screw 66, either the head 66A or flange 66B will bear against the depending flange 60 (or flange 62 on the opposite side) and will cause the lower pintel arm 40 to be shifted relative to the upper pintel arm 42. The upper pintel arm 42 pivots about the axis of the trunion control shaft 36 on the respective hydrostatic pump or transmission.

The trunion shaft 36 is the drive and speed control shaft for the respective hydrostatic pumps. After the steering links have been centered with the centering plate 16 and spring 20 and related mechanism, the top pintel arm is held in the spring centered position. Arm clamp bolts 50 and 52 can be loosened. Then the bottom pintel arm 40 can be adjusted relative to the top pintle arm 42 by rotating screw 66 to shift the bottom pintel arm 40 and the trunion shaft 36 for the respective hydrostatic pump relative to the top pintel arm 42. This adjustment is carried out until the trunion shaft 36 is in fact in a neutral or off (no drive) position. This will mean that there would be no drive or output from the respective hydrostatic pump forming part of the hydrostatic transmission.

Once the neutral position of the trunion shaft has been reached, the top pintel arm 42 is then clamped onto the bottom pintel arm 40 with the clamp bolts 50 and 52 to securely hold the two pintel arms together to form the pintel arm assembly 28. Movement for drive direction and speed is by moving the steering links, but it is insured that the spring centering mechanism will center the trunion shafts of the hydrostatic transmission to insure that the pumps are in neutral.

Figure 6:
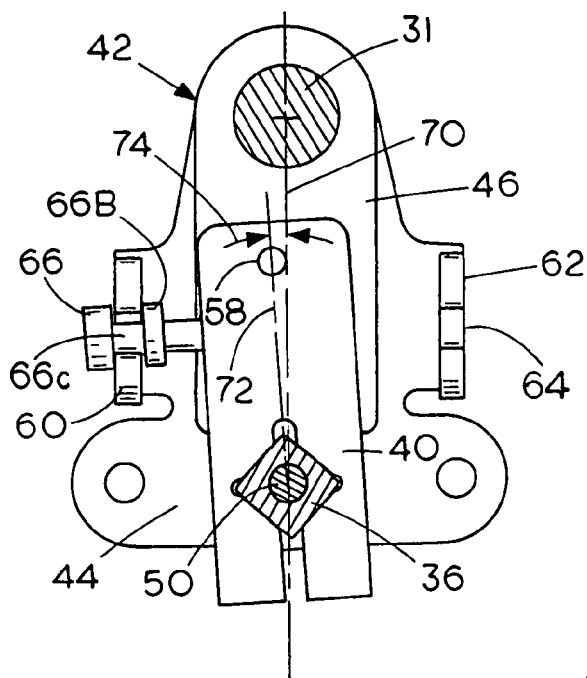
FIG. 6 is a second bottom plan view showing the adjustment of the control arm in a first position.
Figure 7:
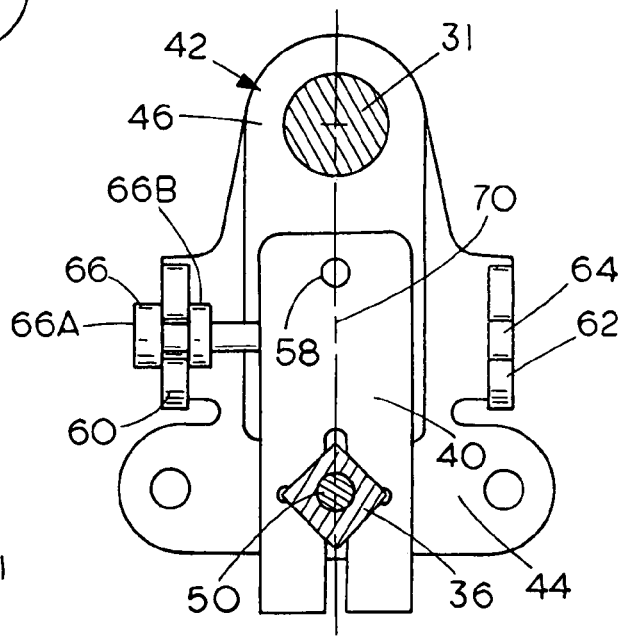
FIG. 7 is a third bottom plan similar to FIG. 6 showing the adjustment of the control arm assembly in a substantially centered position.
Figure 8:
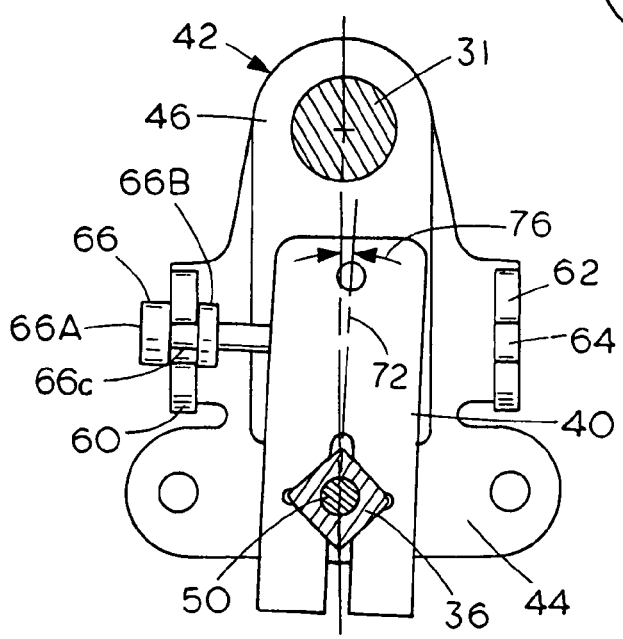
FIG. 8 is a fourth bottom plan view similar to FIGS. 6 and 7 with the control arm assembly shown adjusted to a position in opposite direction from FIG. 6.

FIGS. 6, 7 and 8 are illustrations of bottom views of the pintle arm assembly 28 comprising top and bottom pintle arms 40 and 42, showing different angular positions of the top and bottom pintel arms relative to each other. FIG. 6 shows the adjustment screw 66 threaded into the bore 65 to shift the top and bottom pintel arms in a first angular direction from the line 70 between the center axis of the trunion shaft 36 and the center of pivot bolt 31 connected to the steering link 31. The adjusted angle between line 70 and a center line 72 of the bottom pintel arm 40 is indicated by double arrows 74.

FIG. 7 shows the adjustment screw 66 adjusted so that the bottom pintel arm 40 is in approximately a centered position relative to the line 70 between the center axis of the trunion shaft 36 and the center axis of the pivot bolt 31 for the steering link.

FIG. 8 shows the adjustment screw 66 threaded outwardly to shift the bottom pintel arm 40 relative to the top pintel arm 42 in an opposite direction from that shown in FIG. 6. The adjustment angle is indicated by double arrows 76 in FIG. 8.

Once the adjustment to a null or zero position has been made with the adjustment screw 66, the clamp bolts 50 and 52 are tightened down so that the top and bottom pintel arms 40 and 42 are clamped as a unit and any movement of the steering links 30 or 32 will cause pivoting of the respective trunion shaft 36 and provides an output of the hydrostatic transmission.

Only one adjustment screw 66 is needed for each pintel arm assembly. The adjustment screw is used on the forward side of the pintel arms for ease of access for adjustment. Two flanges 60 and 62 are provided on the two sides of top pintel arm 44, so the arm can be used on the trunion shaft of either one of the hydrostatic pumps, and still have the adjustment flange to a selected side of the vehicle so it is accessible.

Thus, the creep adjustment, to adjust the pintle arm of each pump to neutral is quickly, easily and precisely made by having the threaded adjustment screw acting between two pintel arm sections that are releaseables to be relatively pivotable about the axis of the trunion or control shaft of the hydrostatic transmission, and which then can be clamped together for operation.

Although the present invention has been described with reference to preferred embodiments, workers skilled in the art will recognize that changes may be made in form and detail without departing from the spirit and scope of the invention.

What is claimed is:

1. A control arm assembly for pivoting a control shaft of a drive element, the drive element having a centered shaft position, and the control arm being controlled externally of the drive element and urged to an arm centered position, the control arm assembly having a first arm portion fixed to the control shaft, and a second arm portion moveably mounted relative to the first arm portion and fixable in position relative to the first arm portion, the second arm portion being moveable shifts an outer end of the second arm portion relative to a radial reference line extending from a pivot axis of the control shaft, wherein the second arm portion comprises a first arm plate mounted on the control shaft, and a second arm plate fixedly mounted over the first arm plate, the second arm plate having at least one flange depending therefrom and aligned with and spaced from a side surface of the first arm portion, an adjustment screw passes through an opening in the flange and threading into a bore in the side surface of the first arm portion.

2. The control arm assembly of claim 1 and the adjustment screw that threadably adjusts a relative position between the first and second arm portions.

3. The control arm assembly of claim 2 and further comprising an external control link connected to an end of the second arm portion.

4. The control arm assembly of claim 1, wherein said second arm portion is mounted over an outer end of the control shaft, and is movable about a central axis of the control shaft, and an adjustment slot on the second arm portion, a clamp screw, a threaded bore in the first arm portion aligned with the adjustment slot for receiving the clamp screw, the clamp screw passing through the adjustment slot and being threadable into the aligned threaded bore in the first arm portion to clamp the second arm portion relative to the first arm portion.

5. The control arm of claim 4, wherein said first and second arm plates forming the arm portions have generally planar mating surfaces that clamp together.

6. A centering system for a hydrostatic drive on a vehicle, said hydrostatic drive having a controllable output that is controlled in response to a position of a rotatable trunion shaft, the output comprising a drive to propel the vehicle, a steering link for controlling movement of the trunion shaft to control the direction and speed of the output, an arm assembly mounted on the trunion shaft and extending outwardly therefrom, said arm assembly comprising a first arm portion and a second arm portion, the first arm portion being connected to drive the trunion shaft, the second arm portion being mounted on the first arm portion and moveable relative to the first arm portion about a central axis of the trunion shaft, the first and second arm portions being releasably clampable together, said steering link connected to an outer end of the second arm portion, an adjustment screw coupled between the first and second arm portions for adjusting the relative positions between the first and second arm portions such that when the outer end of the second arm portion is held in a reference position by the steering link, and the adjustment screw is rotated, the first arm portion is moved relative to the second arm portion to move the trunion shaft to a desired position, and a clamp screw separate from the adjustment screw, passing through a slot in the second arm portion, which overlies the second arm portion, the clamp screw being threaded into a bore in the first arm portion, and being releasable to permit the first and second arm portions to move relative to each other and threadable to clamp the first and second arm portions together.

7. The centering system of claim 6, wherein the second arm portion has a flange that overlaps a side of the first arm portion and said adjustment screw comprises a screw rotatably coupled to the flange and threadable into an adjustment bore in a side surface of the first arm portion, to adjust the relative positions of the arm portions.

8. A centering system for a hydrostatic drive on a vehicle, said hydrostatic drive having a controllable output that is controlled in response to a position of a rotatable trunion shaft, a link for controlling movement of the trunion shaft, an arm assembly mounted on the trunion shaft and extending outwardly therefrom, said arm assembly comprising a first arm portion and a second arm portion, the first arm portion being connected to drive the trunion shaft, the second arm portion being mounted on the first arm portion and moveable relative to the first arm portion about a central axis of the trunion shaft, the first and second arm portions being releasably clampable together, said link being connected to an outer end of the second arm portion, and an adjustment screw for adjusting the relative positions between the first and second arm portions such that when the outer end of the second arm portion is held in a reference position by the link, and the adjustment screw is rotated, the first arm portion is moved relative to the second arm portion to move the trunion shaft to a desired position, said adjustment screw comprising a screw threadable into a bore in a side surface of the first arm portion, said adjustment screw having a fixed radial collar spaced from a head of the adjustment screw to form an annular slot adjacent the head of the adjustment screw, flange on the second arm portion that overlaps and aligns with the bore in the side surface of the first arm portion, the flange having a slot that fits over the adjustment screw with surfaces of the flange in the slot on the adjustment screw so that the adjustment screw moves the flange when the adjustment screw is rotated in either one of two directions of rotation.

* * * * *

UNITED STATES PATENT AND TRADEMARK OFFICE
CERTIFICATE OF CORRECTION

PATENT NO. : 7,051,641 B2  Page 1 of 1
APPLICATION NO. : 10/896802
DATED : May 30, 2006
INVENTOR(S) : Gerald M. Berg et al.

It is certified that error appears in the above-identified patent and that said Letters Patent is hereby corrected as shown below:

Column 6, line 52, after "screw" insert --a--.

Signed and Sealed this

Twenty-fourth Day of April, 2007

JON W. DUDAS
*Director of the United States Patent and Trademark Office*